Feb. 22, 1949.  P. K. CHATTERJEA ET AL  2,462,071
GENERATION OF ELECTRIC PULSES
Filed March 30, 1945  3 Sheets-Sheet 1

*Inventors*
PRAFULLA K. CHATTERJEA
DERMOT M. AMBROSE
JAMES K. BENEY

By
Edward D. Kinney
*Attorney*

Inventors
PRAFULLA K. CHATTERJEA
DERMOT M. AMBROSE
JAMES K. BENEY
By
Attorney

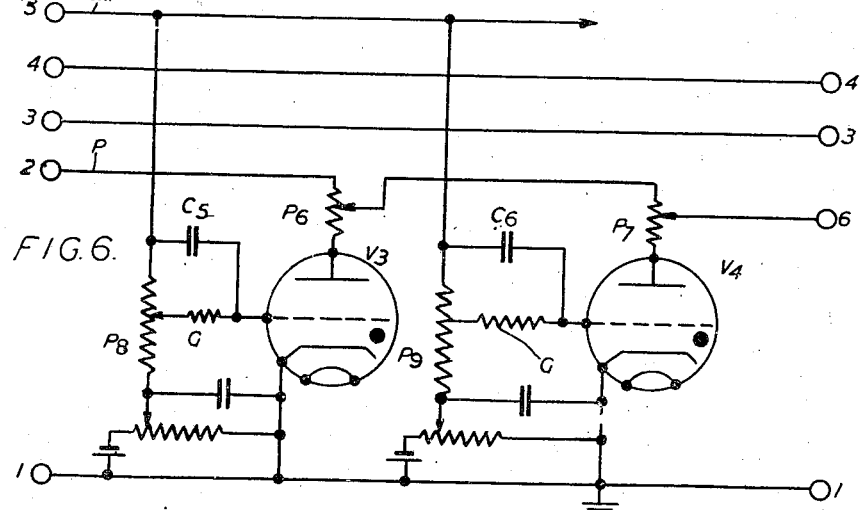
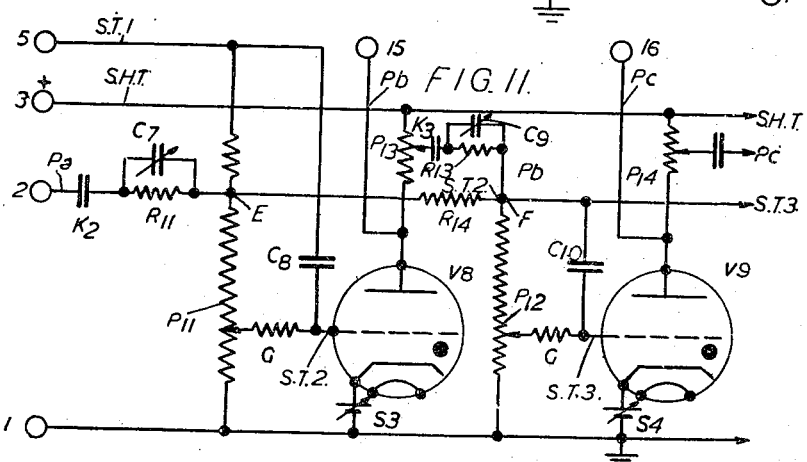
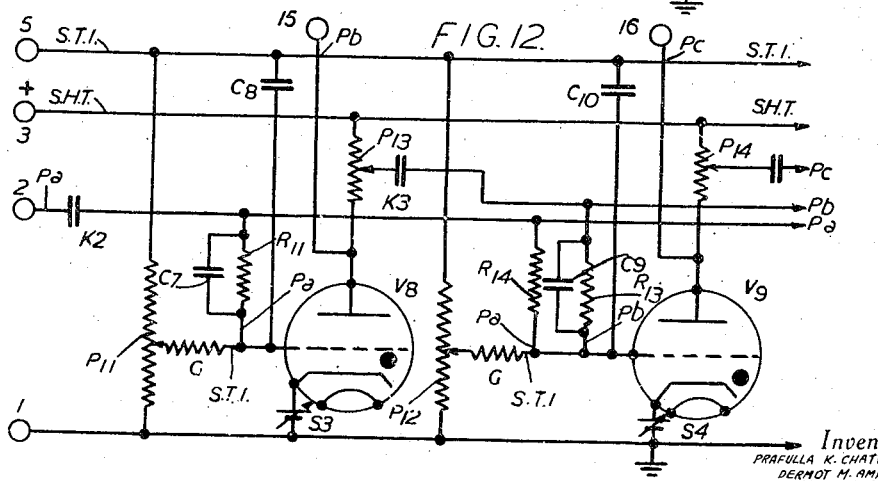

Patented Feb. 22, 1949

2,462,071

UNITED STATES PATENT OFFICE 2,462,071

GENERATION OF ELECTRIC PULSES

Prafulla Kumar Chatterjea, Dermot Min Ambrose, and James Kinloch Beney, London, England, assignors, by mesne assignments, to International Standard Electric Corporation, New York, N. Y., a corporation of Delaware Application March 30, 1945, Serial No. 585,670
In Great Britain March 30, 1944

6 Claims. (Cl. 179—171.5)

The present invention relates to means for generating electric pulses which may be conveniently adjusted as regards frequency of repetition, duration, and amplitude. Such pulses are useful for various kinds of testing arrangements, and for purposes such as obstacle detection and the like where they are particularly suitable for measuring time intervals between transmitted and reflected pulses, for example.

The specification of the copending application No. 477,394, now Patent Number 2,419,590, describes an arrangement for producing electric pulses of variable duration from an alternating or direct current source, sometimes with the help of synchronising pulses. It will be seen from the description which follows that the basic arrangement of the present invention presents certain similarities, but one of the principal differences is that the pulses are self generated independently of any alternating current or synchronizing source applied to the circuit and further, the leading and trailing edges of the pulses are differently produced.

While the pulse generator of the present invention has a variety of applications, as already indicated, it was primarily designed for supplying adjustable pulses of large energy for performance tests of thermionic valves and like electron discharge devices. In order to have a flexible arrangement suitable for a variety of valve tests, it is necessary to be able conveniently to adjust the principal characteristics of the pulses. The generator of the invention is also very easily adaptable for the production of time-duration modulated pulses.

According to the invention, therefore, there is provided an arrangement for generating rectangular electric pulses of adjustable duration comprising means for generating periodic electric waves having a sawtooth form, a device adapted to generate the said pulses by alternating between two conditions of stability under the control of the said waves, and means for adjusting the ratio of the period during which the device remains in one of the said conditions to the period of the said waves.

The invention also provides an arrangement for generating electric pulses of stepped form and adjustable duration comprising means for generating periodic electric waves having a saw-tooth form, a plurality of devices adapted to generate a corresponding plurality of separately timed leading edges for each pulse by changing from a first to second condition of stability under the control of the said waves and to generate a single trailing edge therefor by simultaneously changing back to the first condition under the control of the said waves, and separate means for each of the said devices for adjusting the ratio of the period during which the device remains in the second condtion to the period of the said waves.

The invention further provides an arrangement for generating time modulated rectangular electric pulses, comprising means for generating periodic electric waves having a saw-tooth form, a device adapted to generate the said pulses by alternating between two conditions of stability under the control of the said waves, and means for applying a signal wave to the said device in such manner as to vary the ratio of the respective periods during which the device remains in the said conditions.

Some embodiments of the invention will be described with reference to the accompanying drawings in which:

Fig. 6 shows another embodiment of the invention;

Figs. 11 and 12 show schematic circuit diagrams of two arrangements for deriving secondary trains of pulses from that generated according to Fig. 1.

This specification describes methods of generating rectangular electric pulses whose duration is adjustable within wide limits. It will be convenient to employ the term "duration ratio," which is the ratio of the duration of each pulse to the period of repetition of the pulses. The arrangements to be described will permit adjustment of the duration ratio over a range of only slightly less than 100%.

A train of rectangular pulses is produced when an electrical quantity such as a voltage changes from a fixed value A to another fixed value B, and then changes back again to A after a constant interval $t$, such alternations being regularly repeated at intervals equal to another constant $T$ greater than $t$. Then the duration ratio is $t/T$.

When the duration ratio is small, there is generally no doubt as to what is meant by "the pulses"; but when the duration ratio is adjustable and may be large, there may be some confusion, since a train of A—B—A pulses of duration ratio $t/T$ might just as well be regarded as a train of B—A—B (or inverted) pulses of duration ratio $(T-t)/T$. Similarly there is no doubt which is meant by the leading and trailing edges of the pulses when $t/T$ is small; but they have opposite meanings according as the pulses are considered as A—B—A or B—A—B pulses.

Accordingly in this specification a normal pulse is defined by the alternation A—B—A of an electrical quantity, such as a voltage, where B is algebraically greater than A. Then a pulse B—A—B would be an inverted pulse. The leading edge of the normal pulse is defined by the change A—B, and the trailing edge by the change B—A, the opposite being the case for the inverted pulse.

Figure 1:
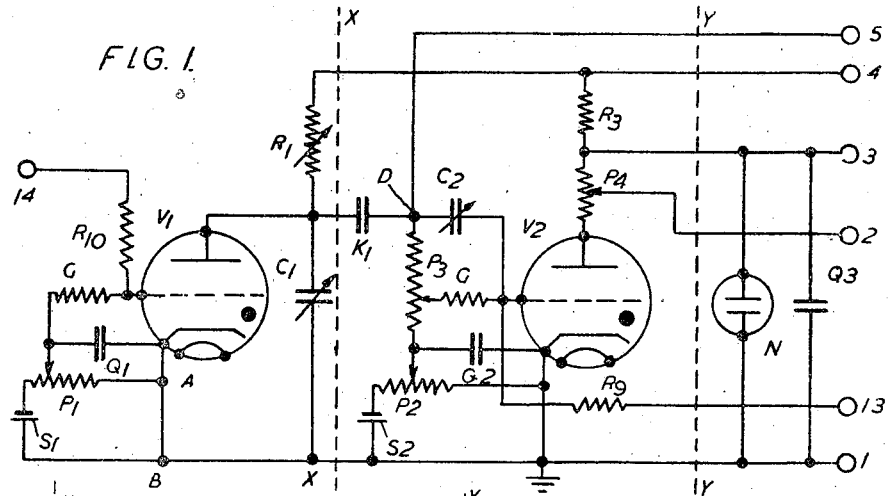
Fig. 1 shows a schematic circuit diagram of one embodiment.

Fig. 1 shows a schematic circuit diagram of one embodiment of the invention and includes the elements necessary for generating rectangular pulses whose amplitude, duration, and frequency of repetition are all independently adjustable. The circuit comprises two grid-controlled gas-filled valves $V_1$ and $V_2$. The valve $V_1$ is arranged to generate saw-tooth waves in association with an adjustable condenser $C_1$ and an adjustable resistance $R_1$ according to a well known arrangement. $R_1$ and $C_1$ are connected in series across the anode potential supply source for the valves, the negative terminal of which is intended to be connected to terminal 1 (which is grounded) and the positive terminal to terminal 4. The anode-cathode circuit of the valve $V_1$ is connected across the condenser $C_1$ and periodically discharges it in the well known way. The control grid of $V_1$ is connected through a suitable grid resistance G to an adjustable grid biasing source which comprises for example, a potentiometer resistance $P_1$ supplied with direct current from a suitable source such as battery $S_1$. The usual by-pass condenser $Q_1$ is provided.

The voltage variations across the condenser $C_1$ are applied through a blocking condenser $K_1$ and a reducing potentiometer $P_3$ to the control grid of the valve $V_2$, an appropriate series grid resistance G being provided. The control grid of $V_2$ is biased negatively in like manner to that of $V_1$ by means of a potentiometer $P_2$, source $S_2$ and by-pass condenser $Q_2$.

Anode potential for the valve $V_2$ is obtained from terminal 4 through a resistance $R_3$ in series with a potentiometer $P_4$ the movable contact of which is connected to the output terminal 2. The junction point of $R_3$ and $P_4$ is connected to another terminal 3, and a stabilising gas-filled tube N (such as a neon tube) is connected between terminals 1 and 3, shunted by a by-pass condenser $Q_3$. A small adjustable condenser $C_2$ is connected directly between the control grid of $V_2$ and the terminal D of the potentiometer $P_3$. The purpose of this condenser will be explained later on.

The tube N is provided to stabilize the operating anode voltage of $V_2$ at about 100 volts, for example, so that it is unaffected by the oscillations of the valve $V_1$ or by any variation of the high tension voltage. If it is desired to operate $V_2$ at a higher voltage, two or more tubes such as N may be connected in series.

The action of the circuit will be explained with reference to the wave-forms shown in Fig. 2. Curve $a$ represents the saw-tooth voltage waves applied to the control grid of valve $V_2$. Let it be first supposed that the contact of the potentiometer $P_2$ is adjusted to the extreme right hand end of the resistance, so that the control grid bias is zero. Then the blocking condenser $K_1$ has the effect of removing the unidirectional component of the voltage waves developed across $C_1$, so that the centre line of the saw-tooth waves marked $v$ in Fig. 2, $a$, would coincide with the time axis OT. However, when the potentiometer is adjusted to produce a negative bias, the saw-tooth waves applied to the control grid of $V_2$ will be moved downwards so that the centre line $v$ occupies a position below the time axis such as that shown.

The horizontal dotted line $v_0$ represents the critical control grid voltage at which the valve $V_2$ ionizes or fires with the operating anode voltage at the value determined by the tube N. If this anode voltage is $E_0=100$ volts, the value of $v_0$ may be about $-4\frac{1}{2}$ volts for example. Before the valve $V_2$ fires, the voltage of the output terminal 2 with respect to ground will be substantially equal to $E_0$, as shown in curve $b$, Fig. 2, but when the rising saw-tooth voltage reaches $v_0$ (at the points $x$ where the sloping portions of the wave cut the $v_0$ line in Fig. 2, $a$), the valve fires and its anode voltage and also the output voltage at terminal 2 then falls substantially instantaneously. The voltage at terminal 2 falls to a value E determined by the setting of the potentiometer $P_4$. At the fly-back stroke $y$, the control grid voltage suddenly falls, and the valve $V_2$ is extinguished, the output voltage returning to the original value $E_0$.

It will be evident that the trailing edges of the pulses $b$, Fig. 2, will be fixed and determined by the fly-back strokes of the saw-tooth waves, but the leading edges may be made to occur earlier or later by decreasing or increasing the negative bias on the control grid of $V_2$, by adjusting the potentiometer $P_2$. This potentiometer could clearly be provided with a pointer and scale calibrated to indicate the duration of the output pulses. It will be evident from Fig. 2, $a$, that if the arrangements for varying the repetition frequency of the saw-tooth waves are such as to maintain the amplitude constant, then the setting of the potentiometer $P_2$ will determine the duration ratio of the pulse, and the scale may be calibrated in terms of this duration ratio.

It is therefore very desirable that the valve $V_1$ should be arranged so that the constant amplitude condition is met. Referring to Fig. 1 for a given grid bias, the valve $V_1$ will fire when the anode voltage reaches a definite value, and when it has fired, the anode voltage is reduced to another definite value which is practically zero. Thus the limits of variation of the voltage of the condenser $C_1$ will be the same whatever values have been chosen for $C_4$ and $R_1$ to obtain the desired frequency, so that the desired constancy of amplitude for the saw-tooth is obtained. However, were the cathode biassed instead of the control grid, there would be an increase of amplitude as $R_1$ is reduced, and vice-versa, on account of the bias variation produced by the changes in the anode current. It is therefore preferable to use a biassing arrangement which allows the cathode to be directly earthed. With this proviso it is not essential that the biassing arrangement for $V_1$ should be as shown in Fig. 1; any other suitable means could be used.

It will of course be understood that $P_1$ will be adjusted to obtain satisfactory oscillating conditions for the valve $V_1$, and will not afterwards be changed. If however the controls of $R_1$ and $C_1$ be calibrated in terms of frequency, then $P_1$ may be used as a trimming adjustment for the frequency of the saw-tooth generator so that it corresponds accurately with the settings of $R_1$ and $C_1$.

Figure 2:
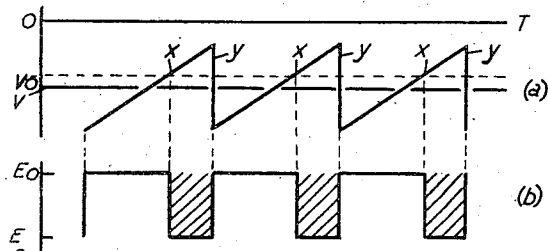
Fig. 2 shows wave forms used in explaining the action of Fig. 1.

In connection with Fig. 2, $a$, if the amplitude of the saw-tooth waves is greater than $2v_0$, the control rid of $V_2$ may have to be biassed positively in order to obtain the larger values of pulse duration. Thus, either provision should be made for both positive and negative bias in the biassing arrangement, or (preferably) the amplitude of the saw-tooth waves should be adjusted to slightly less than $2v_0$.

It is, of course, well known that after the valve $V_2$ has fired, the negative grid voltage must be increased to something greater than $v_0$ (say of the order of $2v_0$) before the valve can be extinguished. This effect is minimised, but not avoided altogether, by using as large an amplitude for the saw-tooth waves as is convenient, and will clearly limit the duration ratio of the pulses, for as this ratio is increased by reducing the grid bias on $V_2$, the downward swing at the fly-back stroke will presently be insufficient to extinguish the valve $V_2$. To overcome this defect, the condenser $C_2$ is provided, and its action may be explained as follows:

While the voltage applied to the control grid of $V_2$ is rising comparatively slowly during the rising portions of the sloping portions of the saw-tooth periods of the sloping portions of the saw-tooth waves, the condenser $C_2$ becomes charged substantially to the potential across the upper portion of the potentiometer $P_3$, the time constant of the circuit comprising $C_2$, $G$, and the lower part of $P_3$ being small compared with the period of repetition. When the fly-back stroke occurs, the charging potential suddenly reverses, but the condenser $C_2$ cannot immediately take up its new potential and therefore momentarily applies on additional negative potential to the control grid equal to the potential drop across the upper part of $P_3$. The saw-tooth waves now appear as shown at $c$, Fig. 2, in which it is supposed that the grid bias of $V_2$ has been reduced so as to raise up the saw-tooth waves with respect to the axis OT. The firing potential line $v_0$ now cuts the waves much lower down giving a high duration ratio, and the sharp peaks $z$ produced by the condenser $C_2$ ensure that the valve is extinguished. It is evident that the above-mentioned time constant must be made very small compared with the repetition period, otherwise the condenser will not take up its new potential quickly enough, so that the accuracy of the larger duration ratios will be affected because the $v_0$ line cuts the waves on the curved parts of the slopes. For this reason, in a generator designed to operate over a wide frequency range, the condenser $C_2$ should be made adjustable so that a suitable time constant can be selected for different parts of the frequency range. In practice it is possible to arrange so that the duration ratio may be accurately adjusted over a range of about 2% to 95%.

The condenser $C_2$ may be alternatively regarded as acting to add to the saw-tooth wave its differential in such a sense as to increase the amplitude of the fly-back stroke.

In a generator designed to cover a large frequency range, this range may be divided into a number of smaller ranges for each of which a different value of $C_1$ is used, thus giving a coarse adjustment for the frequency. $R_1$ may then be a continuously adjustable resistance suitably proportioned to provide the desired fine frequency adjustment in each of the smaller ranges. A number of separate values of $C_2$ corresponding to those of $C_1$ may be provided, and the controls of $C_1$ and $C_2$ may be mechanically coupled together, so that an appropriate value of $C_2$ is selected for each range. If each of these smaller ranges is not too wide, it would be possible to obtain a suitable time constant for the differentiating circuit over the whole range of the generator.

As already explained, having selected the repetition frequency desired for the pulses, the duration ratio may be selected by adjusting $P_2$; and the amplitude of the pulses may be adjusted by means of $P_4$. All these adjustments are substantially independent of one another.

Figure 3:
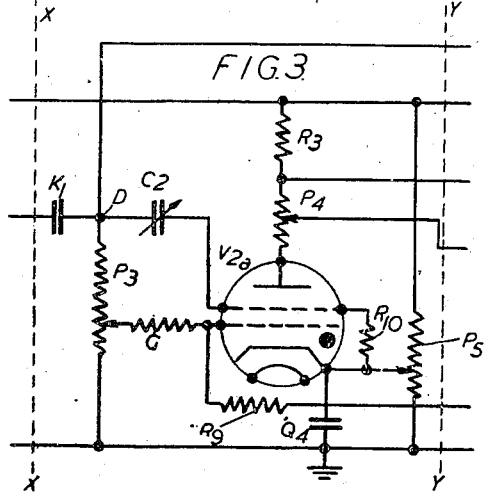
Figs. 3 and 4 show modifications of Fig. 1.

The particular requirements for biassing the valve $V_1$ do not apply to $V_2$. This valve may be quite satisfactorily operated for example by biassing the cathode instead of the control grid, as shown in Fig. 3 which shows how the portion of Fig. 1 between the dotted lines X—X and Y—Y might be modified. In this case, $P_3$ is connected directly to earth, and the cathode is connected to the movable contact of a potentiometer $P_5$ connected across the anode supply source, a by-pass condenser $Q_4$ being provided between the cathode and earth. Any other adjustable biassing device could be used instead.

Fig. 3 also shows another variation in which a gas-filled valve $V_{2a}$ with two grids is used instead of $V_2$ of Fig. 1. The first grid is connected through the resistance G to the potentiometer $P_3$ and controls the firing of the valve in the manner previously described. The extinguishing condenser $C_2$ is, however, connected to the second grid which is connected through a resistance $R_{10}$ to the cathode. The short pulse applied by $C_2$ makes the potential of the second grid momentarily negative, thereby cutting off the anode current and extinguishing the valve. At the same time the potential of the first grid falls below the ionizing value so that the valve does not fire on the disappearance of the short pulse. The control sensitivity of the two grids is very nearly the same (the second grid being slightly less sensitive), and the functions of the two grids could be interchanged. Evidently, also the first grid could have been biassed in the manner shown in Fig. 1.

In a particular generator in accordance with Fig. 1, in which the voltage applied to terminal 4 was 300 volts, and in which the voltage at terminal 3 was stabilised at 100 volts, the maximum output voltage amplitude of the pulses at terminal 2 was about 50 volts, and a milliammeter connected in the manner described gave a steady reading of about 20 milliamperes for 100% pulses.

Figure 4:
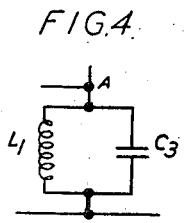

There is an alternative method of ensuring the extinguishing of the valve $V_2$ for high duration ratios. It also has the advantage that it improves the stability of operation for very small duration ratios. According to this method, the connection between the points A and B in Fig. 1 is removed, and in place of this connection there is inserted the parallel resonant circuit comprising an inductance $L_1$ and condenser $C_3$ shown in Fig. 4. The condenser $C_2$ is also disconnected from point D and connected instead to point A.

Figure 5:
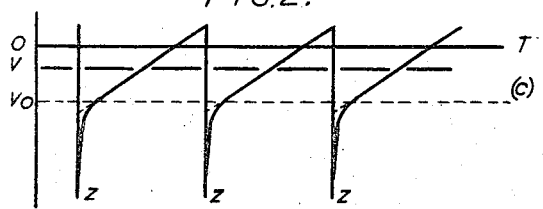
Fig. 5 shows a wave form used in explaining the Fig. 4 modification.

When the fly-back stroke of the saw-tooth wave occurs, a damped train of high frequency oscillations is excited in the resonant circuit by the cathode current which suddenly flows in the inductance $L_1$. The oscillating voltage generated across $L_1$ is applied to the control grid of $V_2$ through the condenser $C_2$ so that the damped oscillations are in effect superposed on the saw-tooth wave, producing a sharp positive peak at the top and a sharp negative peak at the bottom, as shown in Fig. 5. The negative peak ensures the extinction of the valve $V_2$, and the positive peak ensures that the valve will be fired even when the pulse duration ratio is adjusted to a very small value such as 1%. The condenser $C_2$ is of course acting in this case merely as a coupling condenser, and the frequency and damping of the resonant circuit should be chosen so that the damped wave will not interfere with the accuracy of the longer pulses up to duration ratios of say 95%.

Having now described the manner in which the circuit of the invention operates, it is desirable to point out the respects in which it differs from the arrangement of the co-pending application mentioned above. In the present invention the valve $V_2$ generates both the leading and the trailing edge of the adjustable pulse under the control of the saw-tooth waves generated by $V_1$. In the other arrangement the leading edge of the pulse is generated by one gas filled tube which is fired by a synchronising pulse or wave, and the trailing edge is produced by a second gas filled tube which is fired by a condenser charging wave initiated by the firing of the first tube. In this arrangement no periodic succession of saw-tooth waves is generated, and in particular, no use is made of a fly-back stroke to produce the trailing edge of the pulse.

Fig. 6 shows the circuit of an addition to Fig. 1 by which pulses of stepped form may be generated. The terminals 1 to 5 at the left hand side of Fig. 6 are intended to be connected directly to the correspondingly numbered terminals at the right hand side of Fig. 1.

Figure 7:
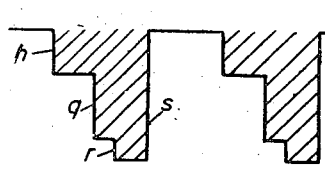
Fig. 7 shows a wave form used in explaining the operation of Fig. 6.
Figure 10:
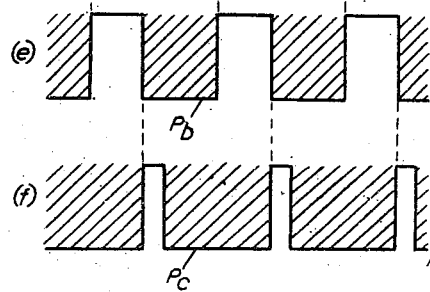
Fig. 10 shows a differentiation circuit for deriving marking pulses from the generated rectangular pulses.

Fig. 6 shows two tandem connected gas-filled valves $V_3$ and $V_4$ similar to $V_2$, and arranged in the same way. The valves are provided with reducing potentiometers $P_8$ and $P_9$ corresponding to $P_3$ and with differentiating condensers $C_5$ and $C_6$ corresponding to $C_2$. Each control grid is separately biassed negatively by an adjustable arrangement similar to those shown in Fig. 1. Saw-tooth waves from the point D in Fig. 1 are applied over terminals 5 to the reducing potentiometers $P_8$ and $P_9$. The anode of $V_3$ is connected through a potentiometer $P_6$ over terminals 2 to the movable contact of the potentiometer $P_4$ in series with the anode of $V_2$, and the anode of $V_4$ is connected through a potentiometer $P_7$ to the movable contact of $P_6$. The generated pulses may be taken from terminal 6 connected to the movable contact of $P_7$. The conductors leading from terminals 2 and 5 in Fig. 6 have been designated P and S. T. to indicate that they carry the pulses and saw-tooth waves respectively, in order to make the operation of Fig. 6 clear. When $V_2$ has fired, the anode of $V_3$ will have a lower effective applied anode potential than $V_2$, according to the setting of $P_4$. By suitably adjusting the grid bias of $V_3$, that valve may be made to fire any desired time after $V_2$ has fired. Similarly, by suitably adjusting $P_6$ and the grid bias of $V_4$, this valve may be made to fire any desired time after $V_3$ has fired. Thus pulses like those shown in Fig. 7 will be obtained at the output terminal 6. The three leading edges $p$, $q$, $r$ are produced respectively by the firing of the valves $V_2$, $V_3$, and $V_4$, and the depths of the corresponding steps depend on the setting of $P_4$, $P_6$ and $P_7$ respectively. The trailing edge $s$ is produced by the fly-back stroke of the saw-tooth wave, which extinguishes all the valves $V_2$, $V_3$ and $V_4$ simultaneously.

The time of firing of the valve $V_3$ will depend on the setting of $P_4$ as well as on the adjustment of its grid bias, so that these two adjustments are not independent; and similarly for $V_4$. But in practice, $P_4$ and $P_6$ will usually be pre-set to obtain the desired depths for the first two steps, after which the timing of each of the three valves is independently adjustable by means of the corresponding grid bias. The depth of the last step is determined by the setting of $P_7$ which does not affect the timing.

It will be evident that any number of extra stages (not shown in Fig. 6) may be added in tandem, all the control grids of the valves being separately biassed and connected to the common saw-tooth wave conductor connected to terminal 5, exactly in the same way as shown for $V_3$ and $V_4$. Although in Figs. 1 and 6 separate biassing sources have been shown for each of the valves for clearness, this is not essential.

Figure 8:
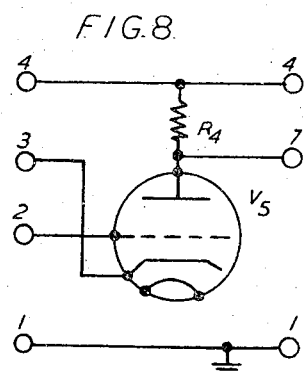
Figs. 8 and 9 show amplifiers which may be used with any of the embodiments of the invention.

The pulses which are obtained at the output terminal 2 of Fig. 1 (or at terminal 6 of Fig. 6) are inverted pulses according to the convention adopted earlier in this specification. They may if desired be converted into normal pulses by adding an inverting valve as indicated in Fig. 8. The terminals 1, 2, 3, 4 at the left hand side of this figure are intended to be connected respectively to terminals 1, 2, 3, 4 at the right hand side of Fig. 1 (or to terminals 1, 6, 3, 4 respectively at the right hand side of Fig. 6 when this has been connected to Fig. 1 in the manner previously explained), the resistance $R_3$ in Fig. 1 being omitted in either case. Fig. 8 comprises an amplifying valve $V_5$ of any suitable type (shown for clearness as a triode, but a pentode or any other type could be used if desired) having its anode supplied from the high tension source connected to terminal 4, through a suitable resistance $R_4$. The cathode is connected through terminals 3 to the fixed potential point at the upper end of $P_4$, and the control grid to the moving contact of $P_4$ (or $P_7$). The anode current of $V_5$ supplies the anode current of $V_2$ as well as the current for the tube N. The output pulses are taken from terminal 7 connected to the anode of $V_5$. It will be evident that when the inverted pulse is omitted by the generator, the potential of the control grid of $V_5$ will be changed negatively, so that the anode voltage will be varied positively, thus giving a normal pulse at the output terminal 7. The valve $V_5$ amplifies the pulse and also inverts it.

Figure 9:
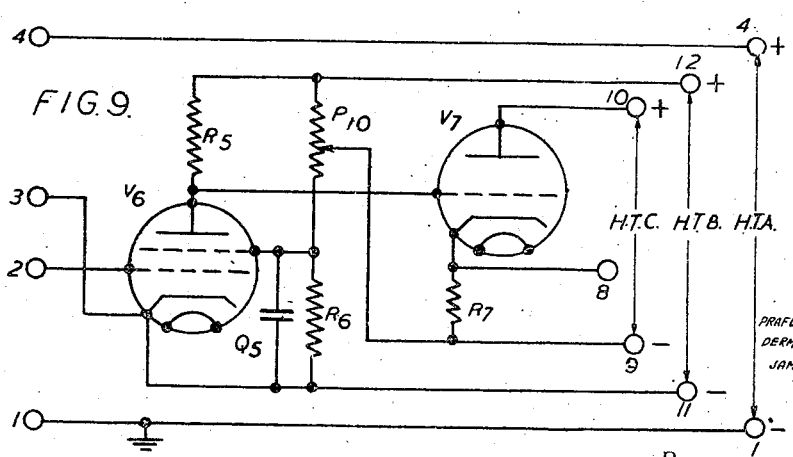

If it is desired to generate pulses of very great energy, the two-stage amplifier shown in Fig. 9 may be coupled to Fig. 1 or Fig. 6 with the terminals 1, 2, 3, 4 at the left hand side connected respectively to the right hand terminals 1, 2, 3, 4, (or 1, 6, 3, 4) as before. It is necessary that all the amplifier stages should be directly coupled, for if condenser-resistance coupling is used, it is impossible in normal amplifying arrangements to obtain independence of the pulse duration and pulse amplitude. This involves the use of separate insulated high tension sources for the generator and for each of the amplifier stages. When the high-tension voltages are obtained by means of rectifiers from an alternating current source, this does not present much difficulty.

The valve $V_6$ is shown as a screen grid valve, and the cathode and control grid are connected in the same way as for $V_5$ of Fig. 8. (The resistance $R_3$ in Fig. 1 should not be removed in this case.) The high tension source H. T. B. for $V_6$ is connected between terminals 11 and 12, of which terminal 11 is connected to the cathode, and terminal 12 through a resistance $R_5$ to the anode. The screen grid of $V_6$ is polarised by an arrangement comprising a resistance $R_6$ connected in series with a potentiometer $P_{10}$ across terminals 11 and 12, the usual by-pass condenser $Q_5$ being provided.

The second stage comprises a power valve $V_7$ arranged as a cathode follower, with a resistance $R_7$ connected in series with the cathode. The high tension source H. T. C. for this valve is connected to terminals 9 and 10, of which 10 is connected to the anode, and 9 to the lower end of $R_7$. The control grid of $V_7$ is connected to the anode of $V_6$, and the lower end of $R_7$ to the movable contact of $P_{10}$. The amplified pulses are obtained between terminals 8 and 9, terminal 8 being connected to the cathode of $V_7$.

It will be seen that by adjusting $P_{10}$, the cathode of $V_7$ can be biassed positively to the control grid, and the preferred adjustment is such that the current in $R_7$ is just reduced to zero, when there is no pulse at the input of $V_6$. When a pulse is generated the potential of the control grid of $V_6$ is made negative to that of the cathode, so that the positive anode potential is raised. This applies a positive potential to the control grid of $V_7$ producing a flow of current through $R_7$, and therefore a normal pulse at the output terminal 8.

It will be seen that the valve $V_6$ is arranged very similarly to $V_5$ of Fig. 8 and acts in the same way as an inverting valve as well as an amplifier; the principal difference is that it has its own separate anode voltage supply.

The anode voltage H. T. A. for the generator (Fig. 1, or Figs. 1 and 6) may be applied to terminals 1 and 4 of Fig. 9 as indicated. This will perhaps be of the order of 300 volts. H. T. B. will probably be rather higher, say 800 volts, so that $V_6$ produces a pulse of considerably greater voltage amplitude, however without much energy in the pulse. $V_7$ is preferably a power amplifier, and the operating voltage H. T. C. for this valve will be still higher, say 1500 volts. This valve, being arranged as a cathode follower, does not invert the pulse, nor does it increase its voltage amplitude but it contributes considerable energy, so that a large current may be drawn from terminals 8 and 9 for the period of each pulse. For example, a generator according to Fig. 1 with an amplifier according to Fig. 9 was able to supply 90% duration pulses at 700 volts and 200 milliamperes, using the high tension voltages suggested above. This generator operated stably over a repetition frequency range of about 250 to 30,000 pulses per second, with a duration ratio variable between 2% and 90%, the frequency, duration ratio, and output amplitude of the pulses being all independently adjustable.

It may be found desirable to connect the heater to the cathode of $V_6$ and possibly also of $V_7$ in order to obtain stable operation for short duration pulses. Any of the valves shown in any of the figures could have directly heated filamentary cathodes, if preferred.

In Fig. 9, the valve $V_6$ need not be a screen grid valve. If it is an ordinary triode, for example, the elements $R_6$ and $Q_5$ may be omitted, the lower end of $P_{10}$ being connected directly to terminal 11.

It will be understood that the adjustment of the bias potentiometer $P_2$ in Fig. 1 to change the duration ratio of the pulses is equivalent to duration modulating the pulses. The arrangement is accordingly easily adaptable for providing a communication channel employing duration modulated pulses. The modulating signal voltage derived in any suitable way may be applied between terminals 1 and 13 of Fig. 1, so that the signal voltage is applied to the control grid of $V_2$ through a resistance $R_9$. The resulting modulated pulses will have a fixed trailing edge. If the bias potentiometer $P_2$ be set to produce a duration ratio of 50%, then a modulation amplitude of very nearly 100% will be possible.

If stepped pulses are generated by adding Fig. 6 to Fig. 1 in the manner already explained, then each of the leading edges $p$, $q$, $r$, etc. (Fig. 7) may be separately modulated by applying a signal voltage to the control grid of each of the valves $V_3$, $V_4$ etc. by the same means as shown in Fig. 1. Thus the stepped pulses may be made to carry several separate communication channels.

Furthermore, by applying a signal voltage to terminal 14 of Fig. 1 through resistance $R_{10}$ to the control grid of the valve $V_1$ which generates the saw-tooth waves, the output pulses at terminal 2 may be frequency modulated in accordance with the signal. By applying different signal voltages at both terminals 13 and 14, two simultaneous communication channels can be obtained, one by frequency modulation and the other by duration modulation of the same pulses.

The arrangements which have been described produce pulses having fixed trailing edges. It is possible to extend these arrangements in order to produce subsidiary trains of pulses in which both edges are movable.

Figs. 11 and 12 show two alternative arrangements by which additional trains of pulses may be derived from the original fixed-edge pulses generated by the arrangement of Fig. 1. The terminals 1, 2, 3 and 5 of either Fig. 11 or Fig. 12 are intended to be connected directly to the correspondingly numbered terminals at the right hand side of Fig. 1. The conductor leading from terminal 2 is designated $P_a$ to indicate that it carries the original pulses generated by Fig. 1. Conductor 3 carries the high tension source stabilised by the neon tube N and is designated S. H. T. Conductor 5 carries the saw-tooth waves generated by the valve $V_1$ and is designated S. T. 1.

Referring to Fig. 11, the original pulses $P_a$ at terminal 2 are applied through a blocking condenser $K_2$ and resistance $R_{11}$ to the upper end E of a reducing potentiometer $P_{11}$. The original saw-tooth waves S. T. 1 are also applied through a resistance $R_{12}$ to the point E where they are added to the pulses $P_a$. The combined wave is applied to the control grid of a gas filled valve $V_8$ through the movable contact of $P_{11}$ and the grid resistance G.

Figure 13:
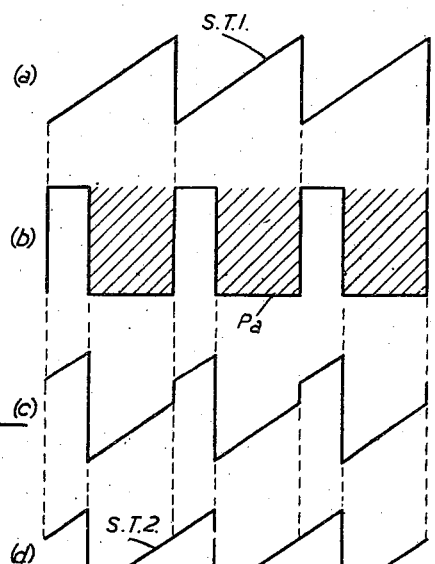
Fig. 13 shows wave forms used in the explanation of the action of Figs. 11 and 12.

Referring to Fig. 13, curve $a$ shows the saw-tooth waves S. T. 1, and $b$ the pulses $P_a$ generated thereby according to Fig. 1. Curve $c$ shows the wave obtained by adding the curves $a$ and $b$. It will be seen to be a stepped saw-tooth wave. If the amplitude of the pulses $P_a$ at the point E is adjusted by means of the potentiometer $P_4$ (Fig.

1) to be equal to that of the saw-tooth waves at this point, then the steps disappear and the saw-tooth wave S. T. 2, as shown by curve $d$ of Fig. 13, is obtained. The wave S. T. 2 is similar to S. T. 1, but is displaced so that its fly-back strokes coincide with the leading edges of the pulses $P_a$. Accordingly, when the potentiometer $P_2$ is adjusted to change the duration ratio of the pulses $P_a$, the saw-tooth waves S. T. 2 are advanced or retarded bodily.

The saw-tooth waves S. T. 2 applied to the valve $V_8$ produce at terminal 15 a second train of pulses $P_b$ shown at $e$ of Fig. 13 in the same way as in Fig. 1; and the trailing edges of these pulses therefore coincide with the leading edges of the pulses $P_a$, and the leading edges of the pulses $P_b$ can be shifted by adjusting the bias of the valve $V_8$. In order to avoid complicating the figure, this valve is shown biassed conventionally by a battery $S_3$ of adjustable voltage connected to the cathode. It will be understood that this is intended to represent any convenient and adjustable biassing arrangement applied to the cathode or control grid, as indicated for example in Fig. 1 or 3.

It will thus be evident that the pulses $P_b$ may be advanced or retarted as a whole by adjusting $P_2$, and their duration ratio may be independently varied by adjusting $S_3$. By applying signal waves at terminal 13 of Fig. 1 the pulses $P_b$ may thus be time-phase modulated, and by applying other signal waves to the control grid of valve $V_8$ in Fig. 11 by the same means (not shown) these pulses may be duration modulated, thus providing two channels. If, however, a signal voltage $v$ be applied to the control grid of $V_2$ and at the same time a voltage $-2v$ of the same signal be applied to the control grid of $V_8$, the combined effect will be to shift the edges of each pulse $P_b$ in opposite direction by equal amounts, thus producing a symmetrical duration modulation. This is, of course, on the assumption that the saw-tooth waves S. T. 1 and S. T. 2 have the same amplitudes and that the valves $V_2$ and $V_8$ are similar.

It should be noted that there may be just appreciable kinks in the sloping portions of the saw-tooth waves S. T. 2 corresponding to the trailing edges of the pulses $P_a$, but no difficulty is found in reducing these kinks to negligible proportions.

It will be evident that the process just described may be repeated, and a third train of pulses $P_c$ shown at $f$ in Fig. 13 may be obtained by adding the waves S. T. 2 to the pulses $P_b$ to produce a third saw-tooth wave S. T. 3. This wave is applied to the control grid of the gas discharge valve $V_9$ exactly in the same way as before, and the pulses $P_c$ are obtained at the terminal 16 connected to the anode of $V_9$.

The saw-tooth waves S. T. 2 are applied through a resistance $R_{14}$ to the end F of the reducing potentiometer $P_{12}$, and the pulses $P_b$ are also applied to F from the potentiometer $P_{13}$, connected in series with the anode of $V_8$, through a blocking condenser $K_3$ and resistance $R_{13}$. The amplitude of the pulses being properly adjusted, saw-tooth waves S. T. 3 are then produced at F similar to S. T. 2, but shifted by an amount depending on the duration ratio of the pulses $P_b$. The wave S. T. 3 being applied to the control grid of the valve $V_9$, produces the pulses $P_c$ as before. The duration ratio of the pulses $P_c$ may be varied by adjusting the biassing source $S_4$. The waves S. T. 3 and pulses $P_c$ obtained from the potentiometer $P_{14}$ connected in series with the anode of $V_9$, may be added together in the same manner and applied to still another valve (not shown), and the same process may be repeated. In this way there may be obtained several trains of pulses such that the leading edges of the pulses in any train coincide with the trailing edges of corresponding pulses of the next train in the series, and such that the duration ratio of the pulses of each train is independently variable.

Since an appreciable amount of power is absorbed in the grid circuits of the generating valves, the reducing potentiometers are necessary to ensure that sufficient amplitude for the waves is available at all the stages. It may be found that sufficient stray capacity acts at the points E and F to produce some distortion, and thus can be compensated by shunting the resistances $R_{11}$ and $R_{13}$ by suitable adjustable condensers $C_7$ and $C_9$. The condensers $C_8$ and $C_{10}$ are the differentiating condensers corresponding to $C_2$ of Fig. 1.

The slightly different method of generating the successive trains of pulses shown in Fig. 12 may perhaps be more easily adaptable than Fig. 11 when a large number of valves is used, for example 10. It depends on the fact that the saw-tooth wave S. T. 3 can be obtained by adding S. T. 1, $P_a$, and $P_b$, as well as by adding S. T. 2 and $P_b$. Thus the saw-tooth wave for any stage is obtained by adding together the original saw-tooth wave S. T. 1 and all the proceeding trains of pulses. The valve $V_8$ is arranged nearly in the same way as in Fig. 11, but the pulses $P_a$ are applied directly to the control grid through $R_{11}$ instead of through the potentiometer $P_{11}$, and the resistance $R_{12}$ is omitted. The waves S. T. 1, and the pulses $P_a$ are thus added together direct on the grid to form the saw-tooth waves S. T. 2 which will be as shown at $d$ in Fig. 13. In the case of the valve $V_9$, the saw-tooth waves S. T. 1 are applied to the control grid through the potentiometer $P_{12}$, the pulses $P_a$ through the resistance $R_{14}$, and the pulses $P_b$ through the resistance $R_{13}$. The mixture then produces the saw-tooth waves S. T. 3, provided that the amplitudes have been appropriately adjusted. If another stage is required, then the waves S. T. 1, and all the pulses $P_a$, $P_b$ and $P_c$ are added together on the grid of the next valve (not shown), and so on.

What is claimed is:

1. A device for generating electric pulses of rectangular shapes comprising means for generating periodic voltage waves having a saw-tooth form, a gas filled tube having a grid, means to apply the said waves to the grid of said tube and means for adjusting the bias of said tube so that the tube is fired when the voltage of the applied wave reaches any predetermined value within a certain range, means responsive to the fly-back portion of the said sawtooth wave, to extinguish said tube thus generating a variable leading edge and a relatively fixed trailing edge for each pulse with an adjustable time interval between them, and means for applying to the said tube a short pulse synchronizing with each fly-back stroke, the said short pulse being adapted to insure the extinction of the said tube.

2. A device according to claim 1 in which the said tube comprises a control grid and an additional grid, the said saw-tooth waves being applied to one of the said grids and the said short pulse to the other grid.

3. A method for generating rectangular electric pulses of adjustable duration comprising the steps of generating aperiodic waves of sawtooth form, using the flyback portion of said sawtooth wave to control the end of the generated pulses, a variable polarisation voltage in combination with said sawtooth wave to fix the time of occurrence of the leading edge of said pulses, inverting said pulses, superimposing them with original sawtooth waves of the same amplitude whereby a second sawtooth wave with adjustable fly-back stroke is obtained, using said adjustable fly-back stroke to control the trailing edge of the pulses and adjustable bias in relation with an original sawtooth wave to control the leading edge of said pulses.

4. A device for generating electric pulses of rectangular shapes comprising means for generating periodic voltage waves having a sawtooth form, a gas filled tube having a grid, means to apply the said waves to the grid of said tube and means for adjusting the bias of said tube so that the tube is fired when the voltage of the applied wave reaches any predetermined value within a certain range, means responsive to the fly-back portion of the said sawtooth wave, to extinguish said tube thus generating a variable leading edge and a relatively fixed trailing edge for each pulse with an adjustable time interval between them, an inverting tube for inverting the generated pulses, mixer means for combining the original sawtooth wave and said inverted pulses with equal amplitude whereby a sawtooth wave with adjustable fly-back stroke is obtained, a gas filled tube, means to apply to said gas tube the original sawtooth wave adjustable bias means for said tube to fire said tube at adjusted times under control of said sawtooth wave and means to extinguish said tube by the fly-back portion of said second sawtooth wave, thus generating a pulse with independently variable leading and trailing edges.

5. A device as in claim 1 further comprising means for applying a signal voltage wave to said tubes for the purpose of producing a symmetrical duration modulation.

6. A device for generating electric pulses of rectangular shapes comprising means for generating periodic voltage waves having a sawtooth form, a gas filled tube having a grid, means to apply the said waves to the grid of said tube and means for adjusting the bias of said tube so that the tube is fired when the voltage of the applied wave reaches any predetermined value within a certain range, means responsive to the fly-back portion of the said sawtooth wave, to extinguish said tube thus generating a variable leading edge and a relatively fixed trailing edge for each pulse with an adjustable time interval between them, and a resonant circuit placed in the cathode lead of the sawtooth generating tube for generating a short pulse synchronized with each fly-back stroke and a connection for superimposing said synchronizing pulse on the sawtooth wave.

PRAFULLA KUMAR CHATTERJEA.
DERMOT MIN AMBROSE.
JAMES KINLOCH BENEY.

REFERENCES CITED

The following references are of record in the file of this patent:

UNITED STATES PATENTS

| Number | Name | Date |
|---|---|---|
| 2,227,596 | Luck | Jan. 7, 1941 |
| 2,292,816 | Bedford | Aug. 11, 1942 |
| 2,308,639 | Beatty et. al. | Jan. 19, 1943 |

OTHER REFERENCES

Industrial Electronics, Gulliksen and Vedder; John Wiley and Sons, pub.; pages 22–23.